(12) United States Patent
Burch

(10) Patent No.: US 6,568,739 B1
(45) Date of Patent: May 27, 2003

(54) PICKUP TRUCK BED TRUNK

(76) Inventor: Kelly Burch, 501 N. Garrett, Elk City, OK (US) 73644

( * ) Notice: Subject to any disclaimer, the term of this patent is extended or adjusted under 35 U.S.C. 154(b) by 0 days.

(21) Appl. No.: 10/143,658

(22) Filed: May 10, 2002

(51) Int. Cl.[7] ................................................ B60P 7/02
(52) U.S. Cl. ........................... 296/100.06; 296/100.07; 296/39.2
(58) Field of Search ........................... 296/100.06, 37.6, 296/57.1, 39.2, 100.02, 26.11, 37.1, 100.07, 100.09, 24.1; 224/404, 403, 542, 402; 414/462

(56) References Cited

U.S. PATENT DOCUMENTS

| | | | | |
|---|---|---|---|---|
| 3,704,039 A | * | 11/1972 | Dean ..................... | 296/100.07 |
| 3,762,762 A | * | 10/1973 | Beveridge et al. ..... | 296/100.07 |
| 3,923,334 A | * | 12/1975 | Key ....................... | 296/100.07 |
| 3,954,296 A | * | 5/1976 | Patnode ................. | 296/10 |
| 4,533,171 A | * | 8/1985 | Lake ...................... | 296/26.06 |
| 4,540,214 A | * | 9/1985 | Wagner .................. | 296/39.2 |
| 4,620,743 A | * | 11/1986 | Eke ........................ | 296/146.8 |
| 4,626,024 A | * | 12/1986 | Swann ................... | 296/216.03 |
| 4,958,876 A | * | 9/1990 | Diaco et al. ............ | 296/39.2 |
| 4,993,771 A | | 2/1991 | Ingerson | |
| 5,018,777 A | * | 5/1991 | Swenson et al. ....... | 296/100.07 |
| 5,127,701 A | * | 7/1992 | Miller .................... | 296/100.06 |
| D366,448 S | | 1/1996 | Ney | |
| 5,564,768 A | | 10/1996 | Saffold | |
| 5,632,522 A | * | 5/1997 | Gaitan et al. .......... | 296/100.06 |
| 5,951,095 A | * | 9/1999 | Herndon ................ | 296/100.09 |
| 5,957,525 A | * | 9/1999 | Nelson .................. | 296/100.06 |
| 5,971,469 A | * | 10/1999 | Lund et al. ............ | 296/100.06 |
| 6,000,740 A | | 12/1999 | Hall | |
| 6,102,474 A | | 8/2000 | Daley | |
| 6,131,983 A | * | 10/2000 | Jackson ................. | 296/39.2 |
| 6,174,012 B1 | | 1/2001 | Saffold | |
| 6,203,090 B1 | * | 3/2001 | Vitoorapakorn ....... | 296/39.2 |
| 6,299,232 B1 | | 10/2001 | Davis | |
| 6,309,005 B1 | * | 10/2001 | Priest et al. ........... | 296/100.06 |
| 6,340,194 B1 | * | 1/2002 | Muirhead et al. ..... | 296/100.06 |
| 6,343,828 B1 | * | 2/2002 | Young et al. .......... | 296/100.06 |
| 6,361,097 B1 | * | 3/2002 | Lechkun ................ | 296/107.08 |
| 6,517,137 B2 | * | 2/2003 | Kiester et al. ......... | 296/39.2 |
| 6,520,558 B1 | * | 2/2003 | Katterloher et al. ... | 296/100.06 |
| 2001/0038225 A1 | * | 11/2001 | Muirhead .............. | 296/100.06 |

* cited by examiner

*Primary Examiner*—Kiran Patel
(74) *Attorney, Agent, or Firm*—Randal D. Homburg

(57) ABSTRACT

The present invention is a bed trunk for a pickup bed of a pickup, inserting and attaching within the pickup bed with a removed pickup tailgate, the bed trunk fitted within the entire pickup bed. The bed trunk forms a trunk cavity with a hinged trunk lid having a locking closure providing the trunk lid with a weather seal engagement to the bed trunk. The trunk lid incorporates a hinged license plate attachment under which a keyed or coded security lock is located, with running lights and accent lights which integrate with the electrical system of the pickup. The bed trunk also includes locking clamps to firmly secure the bed trunk within the pickup bed to prevent theft or removal of the bed trunk from the pickup without access to the truck cavity.

5 Claims, 3 Drawing Sheets

PICKUP TRUCK BED TRUNK

CROSS REFERENCE TO RELATED APPLICATIONS

None

I. BACKGROUND OF THE INVENTION

1. Field of Invention

The present invention is a bed trunk for a pickup bed of a pickup, inserting and attaching within the pickup bed with a removed pickup tailgate, the bed trunk fitted within the entire pickup bed. The bed trunk forms a trunk cavity with a hinged trunk lid having a locking closure providing the trunk lid with a weather seal engagement to the bed trunk. The trunk lid incorporates a hinged license plate attachment under which a keyed or coded security lock is located, with running lights and accent lights which integrate with the electrical system of the pickup. The bed trunk also includes locking clamps to firmly secure the bed trunk within the pickup bed to prevent theft or removal of the bed trunk from the pickup without access to the truck cavity.

2. Description of Prior Art

The following United States patents were discovered and are disclosed within this application for utility patent. All relate to pickup bed storage devices, some incorporated within the pickup bed and others modifying the pickup bed. Most recently, U.S. Pat. No. 6,299,232 to Davis discloses a removable vehicle bed cover attaching to the upper rails of a pickup bed, covering the top of the pickup bed with a hinged panel and a fixed panel. This patent is distinguished from the present invention in that it merely covers the top opening of the pickup bed and does not enclose and conform to the entire pickup bed nor does it provide a complete and self contained enclosure in and of itself.

U.S. Pat. No. 6,174,012 to Saffold discloses a removable storage trunk for trucks, the device forming basically a five sided device attached to and inserted at the rear portion of the pickup bed, with the pickup tailgate serving as the closure for the enclosure, with a weather seal applied at a front surface of the device engaging the inside of the tailgate of the truck. This invention is distinguished from the present invention as the present invention requires the removal of the pickup tailgate to install the present invention, the present invention also providing a complete and self contained enclosure in and of itself.

Likewise, U.S. Pat. No. 5,564,768 to Saffold discloses a portable trunk lid, primarily for a Jeep Wrangle, but also adapted for other vehicle having open bed compartments, the device having a top wall and a front wall, with the top wall having partial side walls engaging the sides of the compartment to which they are applied. Again it is distinguished from the present invention as it does not provide a complete and self contained enclosure in and of itself.

In U.S. Pat. No. 6,102,474 to Daley, a pickup load body is disclosed apparently replacing and being integrated into the side panels of a conventional pickup bed, providing multiple tool storage compartments within the sides of the pickup bed, while leaving the inner compartment of the pickup bed open and unoccupied. The device discloses the lids of the storage compartments having an upper hinged lid which serves as the outer side panel of the pickup bed. This is distinguishable from the present invention, the present invention inserting completely within the bed of the pickup, installing and uninstalling without requiring modification of the standard pickup bed.

A storage compartment located between the pickup cab and pickup bed having a hinged lid accessed from the side of the pickup is disclosed in U.S. Pat. No. D366,448 to Ney, appearing to mount directly to the frame of the pickup, forming a complete and self contained enclosure, but it does not fit within a pickup bed without modification to the pickup bed and chassis. If this device was removed, there would be a space between the cab and the pickup bed.

A storage box with a sliding cover sliding side to side is disclosed in U.S. Pat. No. 4,993,771 to Ingerson, but its primary purpose is to provide the enclosure without interfering with a fifth wheel hitch and trailer attached to the bed of the pickup. This invention is distinguished from the current invention in that the current invention cannot be used with a fifth wheel trailer or hitch, since the current invention completely fills the entire pickup bed, which would not allow access to any fifth wheel trailer or hitch.

II. SUMMARY OF THE INVENTION

The primary objective of the invention is to provide a bed trunk for a pickup bed of a pickup, inserting and attaching within the entire pickup bed with a removed pickup tailgate without any permanent modification or alteration to the pickup bed, providing a complete, self-contained enclosure, having a trunk lid to access the internal cavity of the bed trunk, yet providing the pickup, when the bed trunk is removed, to be quickly returned to its original factory appearance.

The secondary objective of the invention is to provide the bed trunk which inserts into the pickup bed, secured in place without the ability to remove the bed trunk without access to the inside of the bed trunk, and provide a lock for the trunk lid.

A third objective of the bed trunk is to provide the bed trunk with a storage and hauling device which includes the entire pickup bed, providing for weather-proof storage, giving the pickup the appearance of having a trunk resembling that associated with a sedan.

III. DESCRIPTION OF THE DRAWINGS

The following drawings are submitted with this utility patent application.

IV. DESCRIPTION OF THE PREFERRED EMBODIMENT

Figure 1:
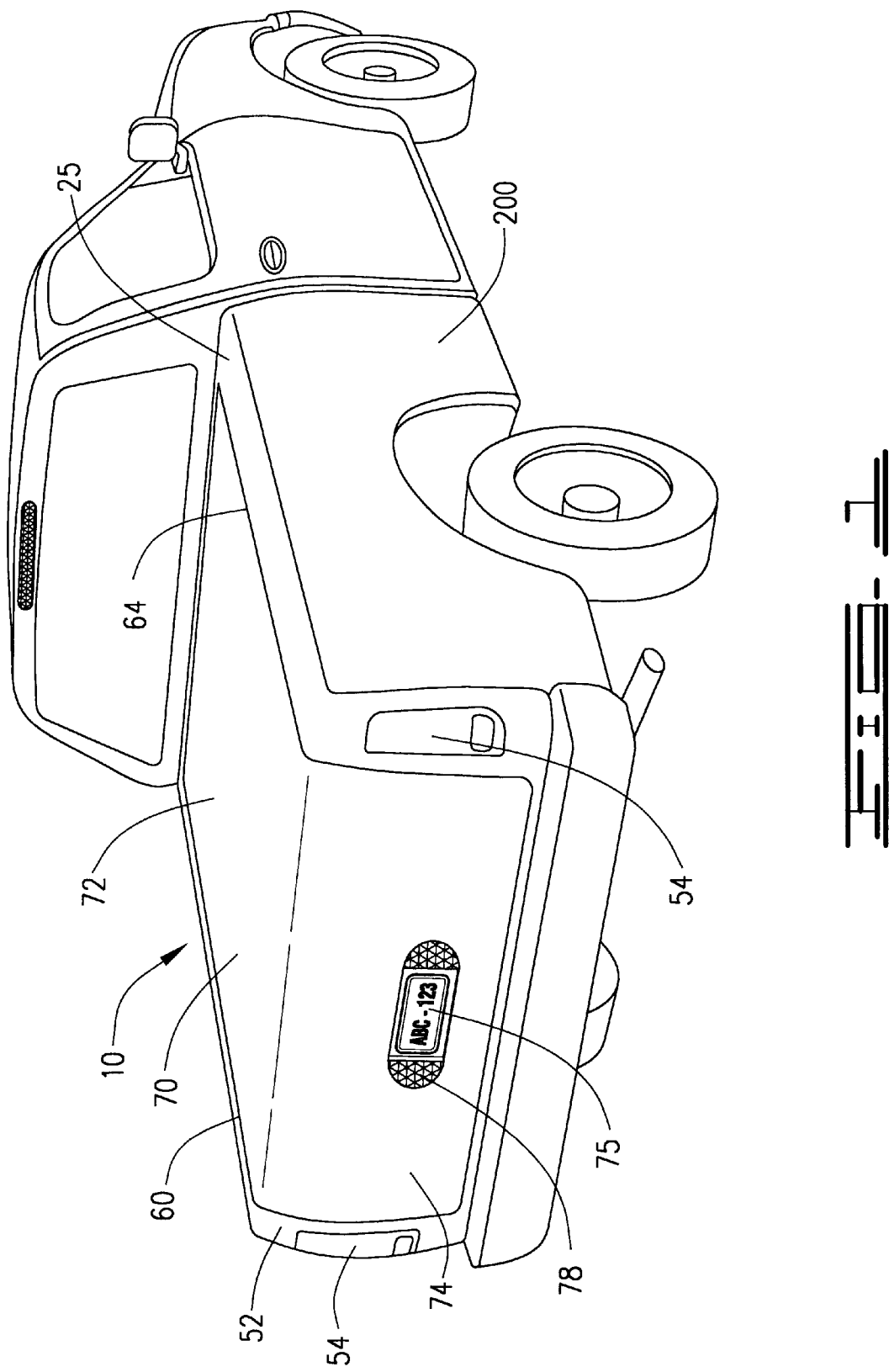
FIG. 1 is a perspective view of the bed trunk applied to the bed of a pickup.
Figure 2:
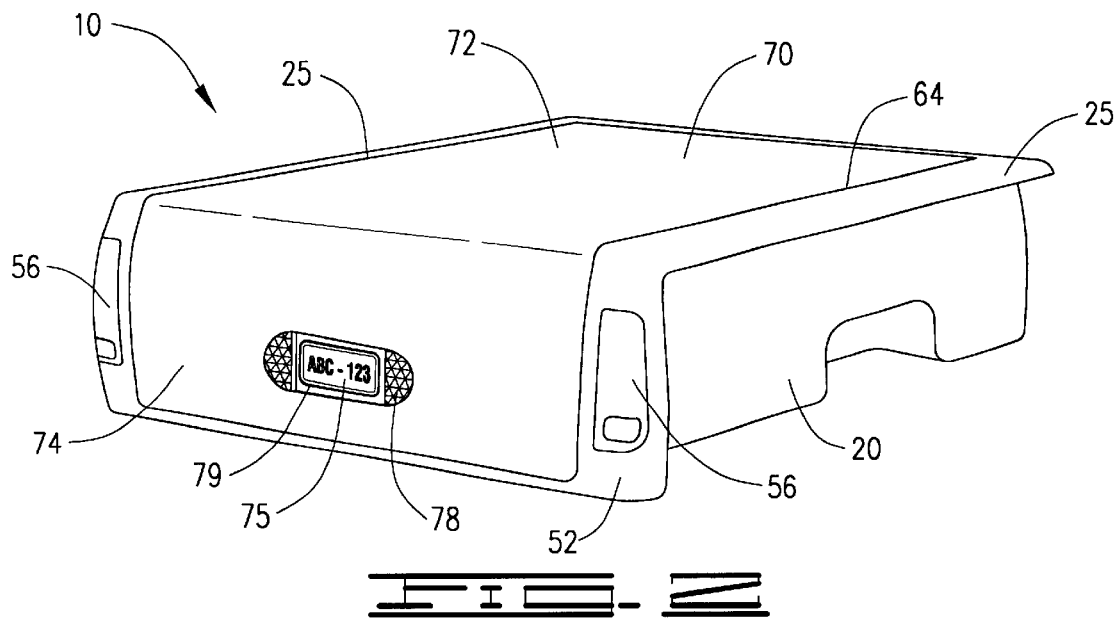
FIG. 2 is a perspective view of the bed trunk alone.
Figure 3:
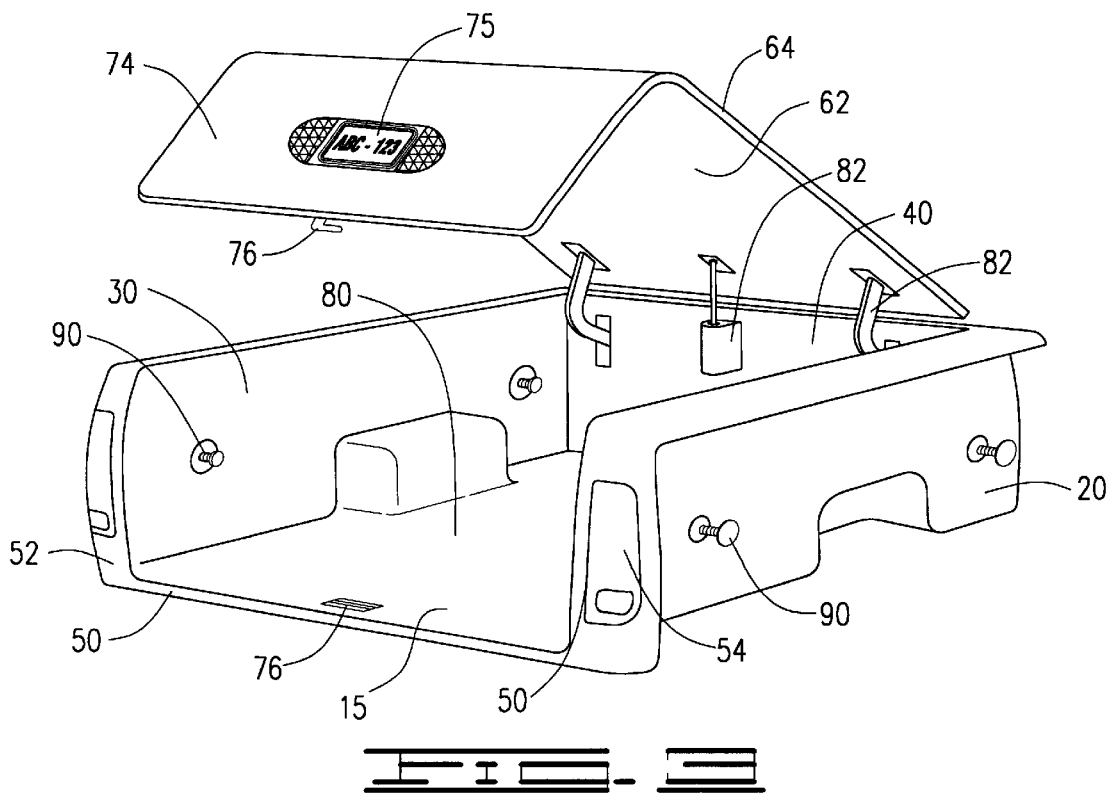
FIG. 3 is a perspective view of the bed trunk with the trunk lid open.

The invention, as shown in FIGS. 1–5 of the drawings, is a removable bed trunk 10 for a pickup bed 200 of a pickup, inserting and attaching within the pickup bed 200 with a removed pickup tailgate, the bed trunk 10 fitted within the entire pickup bed 200 without requiring any modification to the pickup bed 200, such bed trunk 10 comprising a trunk bottom 15 resting upon a bottom of the pickup bed 200, a right panel 20 and left panel 30 forming top rails 25 extending over and above side rails on sides of the pickup bed 200, the right panel 20 and left panel 30 conforming to an inner surface of the right and left sides of the pickup bed 200, a front panel 40 attached to the right panel 20 and left panel 30 at a cab end of the pickup bed 200 against the front of the pickup bed 200, and an end panel 50 positioned at a tailgate opening of the pickup bed 200, extending slightly beyond the tailgate opening of the pickup, with the end panel 50 forming end rails 52 which extend over and around the tailgate opening. An upper perimeter surface 60 extends from the right panel 20, left panel 30, the front panel 40 and the end panel 50. As shown in FIG. 3 of the drawings, an underside 62 of the trunk lid 70 is attached to the front panel 40 by at least two hinges 82, wherein the assembly of the trunk bottom 15, right panel 20, left panel 30, front panel 40, end panel 50 and trunk lid 70 forms a self-contained and completely enclosed trunk cavity 80 which encompasses the entirety of the pickup bed 200. A security attaching means 90, shown in FIGS. 3 and 5 of the drawings, is included within the right panel 20 and left panel 30, accessed from the trunk cavity 80, to secure the bed trunk 10 within the pickup bed 200, stabilizing the attachment to the pickup bed 200 and also preventing removal of the bed trunk 10 from the pickup bed 200 without access to the trunk cavity 80.

Figure 4A:
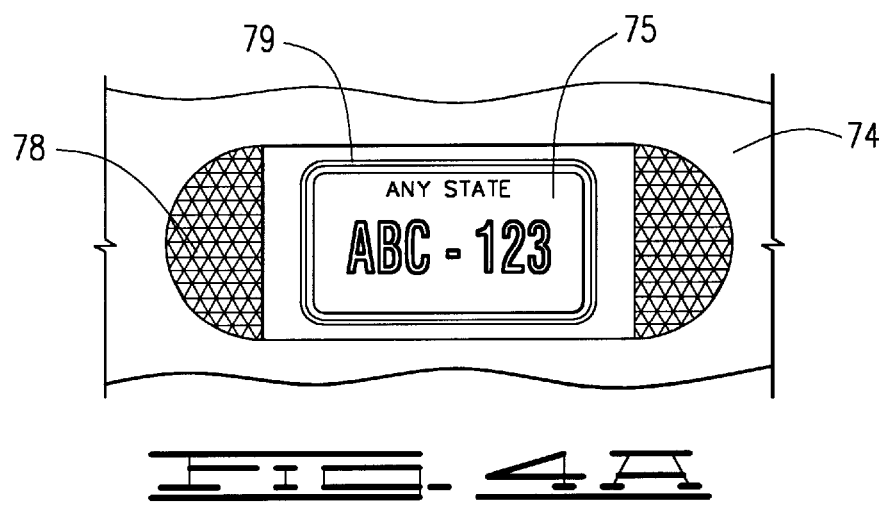
FIG. 4a is a view of the license tag and running lights on the trunk lid.
Figure 4B:
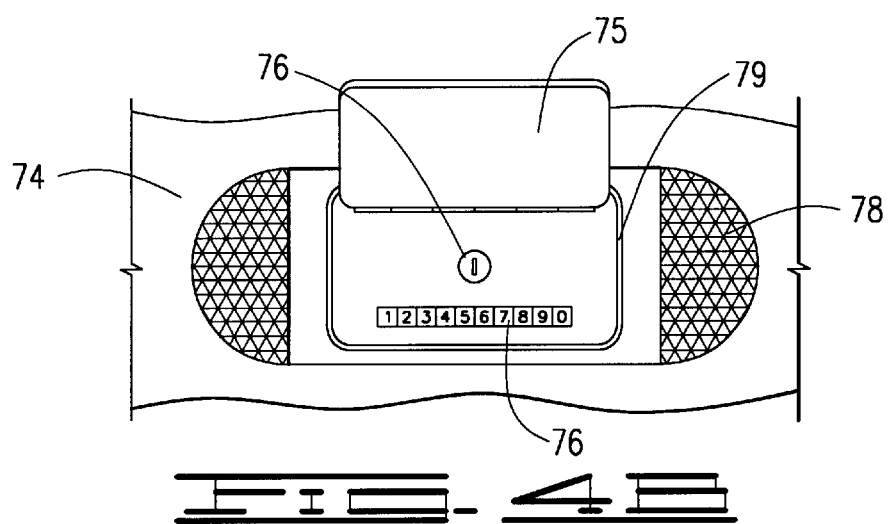
FIG. 4b is a view of the license tag elevated to expose the lock means and the trunk lid handle.

The trunk lid 70 has the underside 62, a horizontal portion 72 and a vertical portion 74 with the hinges 82 attaching the underside 62 of the horizontal portion 72 of the trunk lid 70 to the front panel 40 inside the trunk cavity 80, with a locking closure means 76, indicated in FIGS. 3 and 4b of the drawings, attaching the vertical portion 74 of the trunk lid 70 to the end panel 50, the trunk lid 70 sealably engaging the upper perimeter surface 60 and the end panel 50 with a weather-tight seal 64.

The vertical portion of the trunk lid 70 incorporates a hinged license plate attachment 75 under which the locking closure means 76 is located, as shown in FIGS. 4a and 4b of the drawings. This locking closure means 76 may include a keyed lock or a numbered code digital electronic lock. The vertical portion 74 may also include running lights 78 to illuminate the license tag, and accent lights 79.

Figure 5:
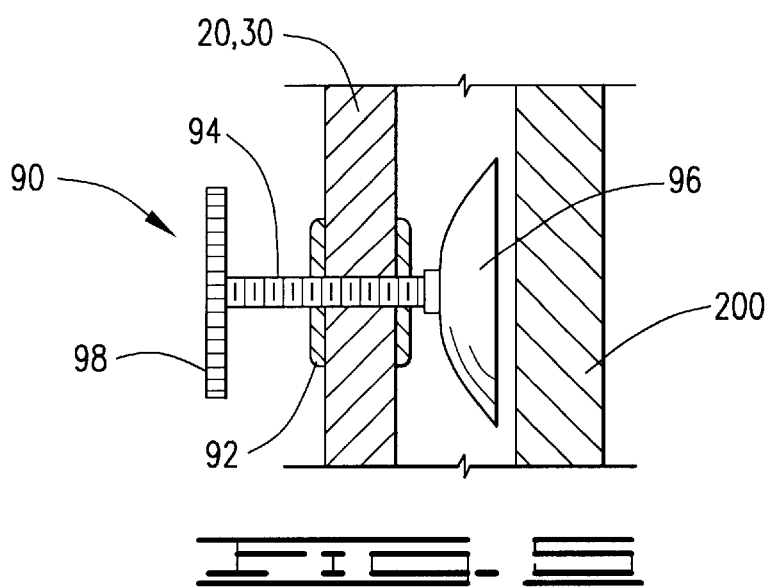
FIG. 5 is a cross-section view of the security attaching means.

The security attaching means 90, in one embodiment shown in FIGS. 3 and 5 of the drawings, includes a plurality 92 of threaded channels traversing the left panel 30 and right panel 20. Each of the plurality 92 of threaded channels incorporates a threaded shaft 94, having a rubber engagement end 96 and a driver end 98, with the rubber engagement end 96 directed towards the inner surface of the right and left sides of the pickup, and the driver end 98 of the threaded shaft 94 inside the trunk cavity 80. To engage this embodiment of the security attaching means 90, the driver end 98 of each threaded shaft 94 is rotated, extending the threaded shaft 94 and the rubber engagement end 96 towards the respective side of the pickup until the rubber engagement end 96 is against the side of the pickup. This is repeated until each of the rubber engagement ends 96 are against the respective sides of the pickup. In a preferred embodiment, there would be at least four of these security attaching means 90 included in the left panel 30 and right panel 20, and perhaps a fifth security attaching means 90 (not shown) located in the front panel 40 of the bed trunk 10, securing the front panel 40 to the front of the pickup bed 200 for added stability.

The end rails 52 on the end panel 50 may extend to cover existing taillights on the pickup. In this embodiment, the end rails 52 may include transparent panels 54, FIG. 1, which allow the taillights of the pickup to illuminate through the transparent panels 54. In the alternative, the end rails 52 may include independent taillights 56, FIG. 2, which may be integrated with the electrical system of the pickup through an electrical connection means, providing for turn signal, backup lights, running lights and other signaling performed by the pickup taillights.

To install the bed trunk 10 in the bed of the pickup, the tailgate of the pickup should be removed. The bed trunk 10 is then placed within the pickup bed 200, with the top rails 25 of the bed trunk 10 placed on the side rails of the pickup bed 200 after which the front panel 40 of the bed trunk 10 is shoved up against the front of the pickup bed 200, with the end rails 52 against the rear of the pickup. The trunk lid 70 is then opened and the security attaching means 90 are engaged, securing the bed trunk 10 into the pickup bed 200. To remove the bed trunk 10, one simply disengages the security attaching means 90 from the pickup bed 200 and slides the bed trunk 10 out of the pickup, replacing the tailgate after removal of the bed trunk 10.

While the invention has been particularly shown and described with reference to a preferred embodiment thereof, it will be understood by those skilled in the art that changes in form and detail may be made therein without departing from the spirit and scope of the invention.

What is claimed is:

1. A removable bed trunk for a pickup bed of a pickup requiring no modification to the pickup bed, inserted and attached within the pickup bed with a removed tailgate, the bed trunk comprising:

a trunk bottom resting upon a bottom of the pickup bed;

a right panel and left panel forming top rails extending over and above side rails on sides of the pickup bed, the right and left sides conforming to an inner surface of the right and left sides of the pickup bed;

a front panel attached to the right panel and left panel at a cab end of the pickup bed against the front of the pickup bed;

an end panel positioned at a tailgate opening of the pickup bed, extending slightly beyond the tailgate opening of the pickup, with the end panel forming end rails which extend over and around the tailgate opening;

an upper perimeter surface extending from the right panel,left panel, the front panel and the end panel;

a trunk lid with a locking closure means is attached to the front panel by at least two hinges, wherein the assembly of the right panel, left panel, front panel, end panel and trunk lid forming a self-contained and completely enclosed trunk cavity which encompasses the entirety of the pickup bed; and a security attaching means is included within the right panel and left panel, accessed from the trunk cavity, securing the bed trunk within the pickup bed, stabilizing the attachment to the pickup bed and also preventing removal of the bed trunk from the pickup bed without access to the trunk cavity.

2. The bed trunk, as disclosed in claim 1, further comprising:

the trunk lid having a horizontal portion and a vertical portion with the locking closure means attaching the vertical portion of the trunk lid to the end panel, the trunk lid sealably engaging the upper perimeter surface and the end panel with a weather-tight seal; and the vertical portion of the trunk lid incorporating a hinged license plate attachment under which the locking closure means is located, the vertical portion also including running lights to illuminate the license tag, and accent lights.

3. The bed trunk, as disclosed in claim 1, wherein the security attaching means includes at least four threaded channels traversing the left panel and right panel, each of the threaded channels incorporating a threaded shaft which has a rubber engagement end and a driver end, the rubber engagement end directed towards the inner surface of the right and left sides of the pickup, and the driver end of the threaded shaft inside the trunk cavity.

4. The bed trunk as disclosed in claim 1, wherein the end rails on the end panel may extend to cover existing taillights on the pickup, the end rails including transparent panels which allow the taillights of the pickup to illuminate and shine through the transparent panels.

5. The bed trunk as disclosed in claim 1, wherein the end rails include independent taillights which are integrated with an electrical system of the pickup, providing these independent taillights with turn signals, backup lights, running lights and other signaling tasks performed by the pickup taillights.

* * * * *